Patented July 8, 1930

1,770,092

UNITED STATES PATENT OFFICE

SIDNEY DAVID SUTTON, OF BRENTFORD, ENGLAND, ASSIGNOR TO VEEDIP LIMITED, OF BRENTFORD, MIDDLESEX, ENGLAND, A LIMITED-LIABILITY COMPANY

THICKENING AND TREATMENT OF LATEX

No Drawing. Application filed March 27, 1928, Serial No. 265,229, and in Great Britain January 2, 1928.

This invention has reference to the production or manufacture of rubber latex either vulcanized or unvulcanized, which is of a relatively thick consistency or viscous.

Many processes are known to exist or have been proposed for the thickening of latex, in some of which chemicals have been added for this purpose, but generally this method of accomplishing this object is objectionable, inasmuch as the methods proposed introduce substances which may be unsuitable or undesirable from a point of view of the quality of the dry rubber desired, or its ageing properties, character and mechanical properties. Or, if detrimental effects in these respects are not produced, the stability of the latex is liable to be upset, and this may necessitate the introduction of other matters into it, for the purpose of protecting or neutralizing the effects of the chemicals to prevent coagulation during the manufacturing operations; and, generally, the introduction of additional maters into the latex, is as above stated, objectionable, and therefore to be avoided if possible.

Thickening of latex has also been affected by concentration, but in this case it is commercially necessary in adopting such a process that the rubber content be high if an appreciable increase in the viscosity is to be obtained, and this is a serious disadvantage, as the margin of error when applying or using the latex, and all the disadvantages produced by a higher rubber content are very much increased. The irregularities on the surface of the rubber articles produced from the latex are more pronounced owing to the high solid content, and also the difficulty of obtaining an even film of latex without bubbles.

Heretofore it has been found, and it is well known, that zinc oxide is one of the substances which cannot readily be worked into latex in any quantity without producing coagulation but I have found, that by working under certain conditions, and within certain limits, zinc oxide (particularly in the form of a very finely divided colloidal zinc oxide) can be, and is according to this invention, employed and applied to thicken latex, that is, for increasing its viscosity; and it also and simultaneously produces a thickened latex of great stability.

The thickening of the latex by zinc oxide however depends largely upon the amount of ammonia present in the latex; and when in ammonia preserved latex, such as sent from different estates from abroad, the ammonia content, and also its natural stability due to the quantity of serum constituents (which is known to vary) is so high that it renders the latex exceedingly stable, the latex is subjected to a preliminary treatment by which the surplus or excess of ammonia is removed, by the methods hereinafter described. Similarly, with latex containing an excess of natural stabilizing agents, when so treated, the effects of the excess or abnormal content of same can be reduced.

As stated, the viscosity of a thickened latex depends largely upon the amount of ammonia present, and if the ammonia is in excess and is reduced, the method or process of thickening herein described is greatly accelerated.

The reduction of ammonia is according to one method accomplished by evaporation by heat without material coagulation, skin formation or concentration; and the evaporation is advantageously effected by running the latex, which may prior to the heating have added to it the small zinc oxide content as referred to, or not as desired, over a suitably heated surface which may be open to the atmosphere, whereby ammonia is driven off to the minimum required; and by controlling the flow and distribution of the latex, the ammonia content can be reduced to said minimum, in which condition a very rapid thickening by the action of the zinc oxide takes place, the resulting product being quite stable and free from coagulation.

In a similar manner, latex which contains an excess of the natural serum constituents can be treated by heating in the manner described, the protecting influence of the serum is affected and the thickening action by the zinc oxide greatly accelerated.

An example of the surface heating means or apparatus which is simple and effective is one consisting of a sloping steam heated surface with corrugations or irregular surface, so that the flow or fall of the liquid is broken or distributed evenly; and while no material concentration or coagulation results, the ammonia is driven off. The temperature to which the latex should be heated should not be above 100° C.

Another method of reducing the free ammonia content, and affecting the serum constituents of latex, is the addition of small quantities of diluted acids, say for example, acetic acid or boric acid. In the case when boric acid is used, it may be mixed with the zinc oxide and added direct to the latex.

As an example of the method of thickening latex by the action of small quantities of zinc oxide, with a latex having an ammonia content of between .75% and 1% actual $NH_4OH$, measure out 40 litres of latex into a suitable vessel, and weigh out 150 grams of colloidal zinc oxide (very finely divided). The zinc oxide is first mixed with water containing a few drops of ammonium hydrate, and brought to a smooth paste. A little latex, say 200 c. c., is then added, and the zinc oxide distributes or disperses evenly, thickening the mass slightly. Further quantities of latex are added slowly until no more thickening takes place, the body being then say in the consistency of a thick batter. The mixture is then thoroughly stirred into the bulk of the latex, and the whole is heated in a water bath to about 95° centrigrade (i. e. boiling water outside the vessel) for two hours, the mixture being stirred frequently during the thickening process.

When the desired viscosity has been arrived at, the latex is removed from the bath, allowed to cool, strained through fine muslin, and is then ready for use, i. e. commercially, or for the manufacture of rubber goods from it in the known ways.

In the case of the treatment of latex having a greater proportion of ammonia than that stated in the above example, the proportion or quantity of finely divided zinc oxide to be added will be proportionately increased.

As an example of the use of acids for the purpose of reducing the free ammonia content in the latex, or the effect of excessive natural stability due to the presence of an excess of serum constituents, about 20 grams of boric acid (powder) may be added to the zinc oxide paste referred to above. Or, if diluted acetic acid (5% to 10%) be used, the acid is added direct to the latex undergoing treatment, stirring very vigorously to prevent local coagulation, the quantity used being proportionate to the ammonia present.

In the case of the thickening method herein described being carried out during the vulcanization of the latex according to known methods, the vulcanizing agents are preferably added to the paste referred to in connection with the treatment above described, the remainder of the process being similar to that above described.

Dyes, pigments or fillers may be added to and mixed with the thickened latex, produced by the use of zinc oxide as above described, without producing coagulation.

Rubber articles made from this latex thickened with zinc oxide, have a very high tensile strength, are durable, and have very good ageing properties; and the latex prepared or treated as above described is very suitable for use in manufacturing rubber articles by the dipping process, the proofing of fabrics, and manufacture of sheet rubber by the well known spreading processes, and otherwise.

What is claimed is:—

1. A method or process of thickening latex without coagulation, consisting in adding to the latex containing ammonia, zinc oxide in a finely divided state in the proportion of about 1% by weight to an ammonia content in the latex of about between .75% and 1% actual $NH_4OH$.

2. A method or process of thickening latex without coagulation, consisting in adding to the latex containing ammonia, zinc oxide in a colloidal state in the proportion of about 1% by weight to an ammonia content in the latex of between .75% and 1% actual $NH_4OH$; mixing the zinc oxide with water and bringing it to a paste form, adding latex to same and producing a thick fluid therefrom, and subsequently adding this fluid to and mixing it with the bulk of latex to be treated, the liquid or mixture being at a temperature such as specified.

3. A method or process of thickening latex containing ammonia by the addition to it of zinc oxide in a finely divided state, and in proportion as herein specified, mixing water with the zinc oxide containing preferably a few drops of ammonium hydrate, adding to it a little latex and bringing it to a smooth paste, then adding a further quantity of latex to produce a thick fluid, and subsequently adding the mixed fluid with the bulk of latex to be treated.

4. In a process or method of thickening latex containing ammonia in excess, or natural serum constituents in excess, first removing or reducing excess of ammonia or serum constituents by heating same, and subsequently adding as the sole stabilizing and thickening agent, a small quantity of zinc oxide in a finely divided state.

5. As a new product a latex thickened and stabilized without coagulation with zinc oxide only in small proportion.

In testimony whereof I have signed my name to this specification.

SIDNEY DAVID SUTTON.